United States Patent
Lytle

(10) Patent No.: US 8,939,578 B2
(45) Date of Patent: Jan. 27, 2015

(54) PROGRESSIVE READING AND INTERMEDIATE DISTANCE LENS DEFINED BY EMPLOYMENT OF A ZERNIKE EXPANSION

(71) Applicant: John D. Lytle, Tuscon, AZ (US)

(72) Inventor: John D. Lytle, Tuscon, AZ (US)

(73) Assignee: Visionware LLC, Granbury, TX (US)

( * ) Notice: Subject to any disclaimer, the term of this patent is extended or adjusted under 35 U.S.C. 154(b) by 0 days.

(21) Appl. No.: 13/749,072

(22) Filed: Jan. 24, 2013

(65) Prior Publication Data

US 2013/0141691 A1    Jun. 6, 2013

Related U.S. Application Data

(63) Continuation of application No. 12/740,172, filed as application No. PCT/US2008/012286 on Oct. 30, 2008, now Pat. No. 8,382,282.

(60) Provisional application No. 61/000,941, filed on Oct. 30, 2007.

(51) Int. Cl.
G02C 7/00 (2006.01)
G02C 7/06 (2006.01)

(52) U.S. Cl.
CPC .............. *G02C 7/061* (2013.01); *G02C 7/063* (2013.01); *G02C 7/066* (2013.01)
USPC .................................................. 351/159.42

(58) Field of Classification Search
USPC .......................... 351/159.01, 159.41–159.49, 351/159.52–159.53, 159.73–159.77
See application file for complete search history.

(56) References Cited

U.S. PATENT DOCUMENTS

| | | | |
|---|---|---|---|
| 4,504,128 A | 3/1985 | Guilino et al. |
| 4,762,408 A | 8/1988 | Shinohara |
| 4,778,266 A | 10/1988 | Maitenaz |
| 4,784,482 A | 11/1988 | Guilino |
| 4,861,153 A | 8/1989 | Winthrop |
| 4,906,090 A | 3/1990 | Barth |
| 4,988,182 A | 1/1991 | Takahashi et al. |
| 5,048,945 A | 9/1991 | Ueno et al. |
| 5,050,981 A | 9/1991 | Roffman |
| 5,110,199 A | 5/1992 | Ishida |
| 5,123,725 A | 6/1992 | Winthrop |
| 5,137,343 A | 8/1992 | Kelch et al. |
| 5,210,553 A | 5/1993 | Barth et al. |
| 5,270,745 A | 12/1993 | Pedrono |
| 5,272,495 A | 12/1993 | Pedrono |
| 5,285,222 A | 2/1994 | Waido |
| 5,327,181 A | 7/1994 | Waido |
| 5,500,559 A | 3/1996 | Miyata et al. |
| 5,771,089 A | 6/1998 | Barth |

(Continued)

OTHER PUBLICATIONS

International Search Report dated Jan. 6, 2009 from corresponding PCT/US2008/12286.

(Continued)

*Primary Examiner* — James Greece
(74) *Attorney, Agent, or Firm* — Ohlandt, Greeley, Ruggiero & Perle, L.L.P.

(57) ABSTRACT

There is provided a lens that includes a corridor having a width greater than or equal to about 6 millimeters. The lens has astigmatism less than or equal to about 0.5 diopter within the corridor. There is also provided an item of eyewear that includes such a lens, and a method for representing a surface of an ophthalmic lens.

16 Claims, 12 Drawing Sheets

INCREMENTAL SURFACE POWER—DIOPTER WITH OVERLAY OF CONTOURS OF 0.5 DIOPTER INCREMENTAL SURFACE ASTIGMATISM, LEFT EYE FROM FRONT

(56) References Cited

U.S. PATENT DOCUMENTS

| | | |
|---|---|---|
| 5,861,935 A | 1/1999 | Morris et al. |
| 5,867,246 A | 2/1999 | Edwards et al. |
| 5,920,372 A | 7/1999 | Guilino et al. |
| 6,074,062 A | 6/2000 | Morris et al. |
| 6,086,203 A | 7/2000 | Blum et al. |
| 6,123,422 A | 9/2000 | Menezes et al. |
| 6,176,577 B1 | 1/2001 | Monnoyeur et al. |
| 6,183,084 B1 * | 2/2001 | Chipman et al. ......... 351/159.52 |
| 6,231,184 B1 | 5/2001 | Menezes et al. |
| 2007/0216863 A1 | 9/2007 | Menezes |

OTHER PUBLICATIONS

Bourdoncle, et al.;"Traps in displaying optical performances of a progressive-addition lens" ; Applied Optics, vol. 31, No. 19, Jul. 1, 1992, pp. 3586-3593.

* cited by examiner

ABSOLUTE SAG, LEFT EYE FROM FRONT—MM

SAG FROM BEST FIT SPHERE, LEFT EYE FROM FRONT-MM

THICKNESS, LEFT EYE FROM FRONT—MM

EDGE THICKNESS, LEFT EYE FROM FRONT-MM

INCREMENTAL SURFACE POWER, LEFT EYE FROM FRONT–DIOPTERS

REFRACTED POWER, LEFT EYE FROM FRONT-DIOPTERS

PROGRESSION OF REFACTED POWER IN A 2.0 DIOPTER LENS-DIOPTER

INCREMENTAL SURFACE ASTIGMATISM, LEFT EYE FROM FRONT-DIOPTERS

INCREMENTAL SURFACE POWER-DIOPTER WITH OVERLAY OF CONTOURS OF 0.5
DIOPTER INCREMENTAL SURFACE ASTIGMATISM, LEFT EYE FROM FRONT

REFRACTED POWER–DIOPTERS WITH OVERLAY OF CONTOURS OF
.0.0005 RMS ANGULAR BLUR RADIUS–RADIANS, LEFT EYE FROM FRONT

PROGRESSIVE READING AND INTERMEDIATE DISTANCE LENS DEFINED BY EMPLOYMENT OF A ZERNIKE EXPANSION

BACKGROUND OF THE INVENTION

1. Field of the Invention

The present invention relates to ophthalmic lenses and more particularly, to ophthalmic lenses for the compensation of presbyopia.

2. Description of the Prior Art

Presbyopia is a condition characterized by a reduction in a person's ability to focus upon nearby objects, i.e., accommodation. The onset of presbyopia normally occurs at around the age of forty, even in those people having otherwise good health and normal vision. The condition makes near-distance activities, such as reading, typing, and so on more difficult, or even impossible in advanced cases. Close work may be accomplished more comfortably, in most cases, by utilizing simple single-vision positive lenses having a refractive power of one to three diopters. For many years, this refractive power has been "added" to the prescriptions of people having other refractive deficiencies, e.g., myopia, astigmatism, etc., in the form of "bifocals," or, when accommodation is severely limited, "trifocals".

An annoying demarcation between the distance and reading portions of these lenses led to development of "blended" lenses. The distance and reading portions of the lenses are artificially obliterated, but nonetheless remain in a form that interferes with a comfortable transfer from distance to reading portions.

A true multifocal lens has a property such that the refractive power varies continuously and monotonically from top to bottom. While a perceived image quality, i.e., acuity, may vary considerably with a direction of view, i.e., horizontal look angle, some useful image quality is available in most areas of the lens. This type of lens has become known as a "progressive addition" lens (PAL), or "progressive multifocal", "a lens designed to provide correction for more than one viewing distance in which the power changes continuously rather than discretely" (ANSI Z80.1-1999 for Ophthalmics—Prescription Ophthalmic lenses—Recommendations). Many such designs possess a di-polar character, possessing two identifiable areas intended for distance viewing and reading, which are normally connected by a narrow corridor of reasonably good image quality, where power of the lens varies from that required for reading to the distance prescription.

One such design is described by U.S. Pat. No. 5,123,725 to Winthrop, entitled "Progression Addition Spectacle Lens". A lens design having similar characteristics is documented in U.S. Pat. No. 5,048,945 to Ueno et. al., entitled "Progressive Power Lens". Although these lenses appear to function in a similar fashion, the derivation of the shape for their active surface is quite different from one another. Likewise for U.S. Pat. No. 4,988,182 to Takahashi.

Multifocal lenses typically achieve their performance by generalizing the well-known bifocal, or trifocal lenses to include a multiplicity of continuous zones of varying refractive power. This is accomplished by making one of the lens surfaces a non-spherical, i.e., aspheric, shape. In most cases, this aspheric surface is mathematically modeled so that its contours may be manipulated and, finally described with great accuracy for manufacturing purposes. Thus, many modern progressive lens designs are based on an application of differential geometry, and some incorporate methods of variational calculus, or a graphical equivalent, to derive progressive surfaces necessary to obtain a desired refractive power distribution that will satisfy functional requirements and boundary conditions. See O. N. Stavroudis, "The Optics of Rays, Wavefronts and Caustics", Academic Press, 1972.

The differential geometry representation of PAL surfaces provides incomplete information, with the possibility of misleading an analyst about image quality. The surfaces that result from the application of these design techniques may indeed produce power distributions that are sought, albeit in a narrow vertical corridor, but the visual acuity is often compromised by attempts to expand the power range, or to compress it into too short a vertical corridor. The result is that good vision may be obtained only in discrete areas targeted for distance and near viewing, with the remainder of the corridor, and most areas outside the corridor, delivering only marginal image quality.

A mean local curvature of the aspheric surface of the lens may be controlled, within limits imposed by the power distribution requirements and aberration constraints, to achieve a desired variation in diopter power. Aberration content of a progressive addition lens is ordinarily characterized by evaluating a difference in principal curvatures in geodesic orientations at selected points on the lens, and is conventionally expressed solely as astigmatism.

An assumption that the aberration content is pure astigmatism is, of course, a simplistic one. If ray pencils are small, the approximation may be fairly good. If the ray pencils pass into a fully dark-adapted eye, many different aberration components may be present, and it is a summation of these that will determine the ultimate visual acuity when viewing through different sections of the lens.

The characterization of any PAL reduces, naturally, to some physical surface shape. This shape should ideally be continuous, monotonic, and free of severe second and third partial derivatives, otherwise the user will be acutely aware of local variations in both geometric distortion and acuity, and will experience discomfort in extended use. These limitations restrict the power distributions that may be implemented in practice. If the local power of a PAL is required to change rapidly from point to point, severe inflections in the aspheric surface will be present, and the stigmatism of the transmitted ray pencil will be less than ideal in some portions of the lens.

Another aspect of the surface characterization problem is that any such surface must be accurately modeled mathematically in order to be generated and manufactured. Many mathematical representations have been applied to the characterization of PAL surfaces. Most of these have been Cartesian-based, that is, expressed in X-Y coordinates. This is not necessarily bad, but since the eye pupil is a circular aperture, it makes some sense to fit a function to the PAL surface that is based upon polar coordinate geometry. As in many other situations requiring mathematical analysis, matters are made easier by choosing a coordinate system matched to the physical circumstances.

People normally perform reading tasks in a large variety of head and body positions. While certain texts describe "ideal" body geometry for fatigue-free reading, this is rarely realized in practice. Compromises made to achieve a desired power distribution, coupled with a need to accommodate the physiological act of convergence of the two separate visual systems when reading, often results in a need for the user to retrain himself to substitute head movement, when using PALs, for the more natural act of eye movement. Further, variations over a user base of interpupillary distance, center-of-rotation, and other facial characteristics, require that each prescription be custom fitted with great care. These "fitting factors" limit the scope of application and the overall utility of these designs. A design that is not constrained by these fitting factors will find more widespread application, and will be easier to accept in use.

SUMMARY OF THE INVENTION

There is a need for a progressive addition lens with continuous monotonic change of powers, with no zone of stable power, tailored to provide high visual acuity for users involved in reading and in viewing at near and intermediate distances up to about four meters. The lens, or a pair of such lenses, can be situated in a lens holder, for example, a frame or rim for a pair of glasses or holder for a pair of rimless glasses.

There is also a need for such a lens with smooth gradual uninterrupted change of powers that may be worn and used comfortably and effectively without a need for custom fitting, and that contains the powers in a wide corridor that allows its user to function without excess head movement in order to keep viewed objects constrained within a narrow corridor of high acuity.

There is described herein a lens that includes a corridor, i.e., zone of high acuity viewing incorporating near and intermediate distances, having a width greater than or equal to about 6 millimeters along its length. The lens exhibits astigmatism less than or equal to about 0.5 diopter within the corridor and a linear progression of power changes between the top and bottom of the corridor.

There is described herein a lens that includes a corridor, i.e., zone of high acuity viewing incorporating near and intermediate distances, having a width greater than or equal to about 10 millimeters along its length. The lens exhibits a refracted root-mean-square (RMS) angular blur radius less than or equal to about 0.0005 radians within the corridor and power progresses linearly between the top and bottom of the corridor.

There is also described herein an item of eyewear. The item of eyewear includes a pair of progressive addition lenses situated in a lens holder to satisfy a span of interpupillary distances of at least 6 millimeters.

A method described herein includes using a Zernike expansion to represent a surface of an ophthalmic lens.

Another method described herein includes using a Zernike expansion to represent a surface for each of a pair of progressive addition aspheric lenses, and situating the pair of lenses in a lens holder to satisfy a span of interpupillary distances of at least 6 millimeters.

Another method described herein includes designing an ophthalmic lens, where the designing employs, as a design parameter, a pupil size of a wearer under conditions of use of the ophthalmic lens.

Another method described herein includes designing an ophthalmic lens, where the designing employs, as design parameters, (a) a predetermined boundary shape of the ophthalmic lens for ultimate use, and (b) a predetermined boundary size of the ophthalmic lens for ultimate use.

An embodiment of a lens produced by the methods described herein is a progressive addition lens having a continuous monotonic change of powers at an average rate less than or equal to 0.1 diopter per millimeter from reading at a distance of about 35 centimeters (cm) to about 45 cm from the lens to viewing at near and intermediate distances, from about 50 cm to about four meters from the lens. The powers are within a corridor having a width greater than or equal to about 6 millimeters along its length, wherein the lens has surface astigmatism less than or equal to about 0.5 diopter within the corridor. The corridor expands to a width greater than or equal to about 15 millimeters along its length wherein the lens exhibits astigmatism less than or equal to about 1.0 diopter within the corridor.

Figure 1:
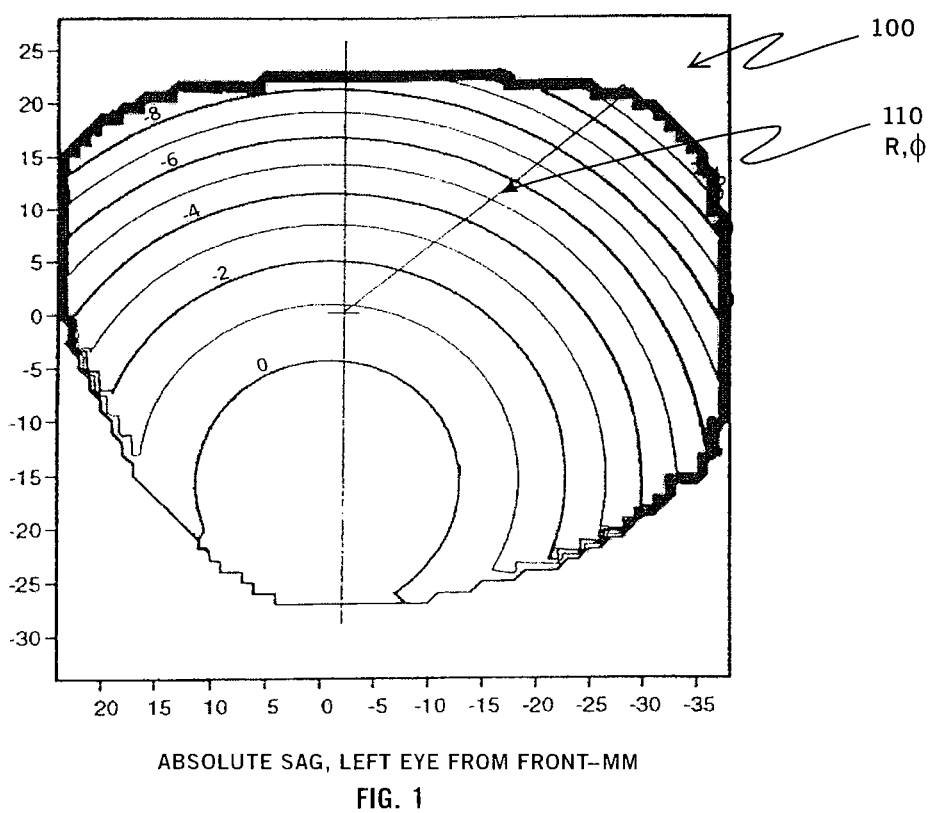
FIG. 1 is a topological plot of the contours of the aspheric surface of a 2.0 diopter lens.

NOTE: The term "incremental" in the description of FIG. 5, FIG. 8 and FIG. 10 refers to the respective component of the surface model that is added to the spherical surface.

DESCRIPTION OF THE INVENTION

The present invention pertains to compensation of presbyopia. An ophthalmic lens is a lens used for correcting or measuring refractive errors of the eye and/or compensating for ocular muscle imbalances (D Cline, H. W. Hofstetter, J. R. Griffin, Dictionary of Visual Sciences, Third Edition, Chilton Book Company, 1980). There is described herein a lens that is non-spherical, i.e., aspheric, and non-symmetrical about a wide corridor of high-acuity. The non-symmetry permits the lens to be better adapted to applications in which no custom fitting operations are performed. Thus, variations in personal facial geometry, and normal convergence of the optical paths, as a user accommodates from intermediate to near objects, may be dealt with more effectively.

Enlarging the field of view, and/or the pupil diameter, of an optical system increases the difficulty of achieving a given level of image quality. Correspondingly, increasing the area of an ophthalmic lens means that a required level of image quality must be achieved over a greater range of input parameters. Since there are only a fixed number of variable parameters to optimize, it stands to reason that requiring this fixed number of variable parameters to address image quality issues over a larger area will result in diminished acuity performance. Reducing the area of the optimization from that of an oversized blank to the specific area of the glazed lens element permits a designer to improve correction with a fixed number of design degrees of freedom. Thus, designing a lens to a specific shape and size will result in improved vision correction properties of the lens.

An aspheric prescription is a formula that includes all parametric information required to model the aspheric surface mathematically and physically. The lens described herein is tailored for use with a specific, preconceived lens boundary shape and size. That is, its aspheric surface geometry is optimized taking into account a final boundary contour. The aspheric prescription is not contrived for an oversized blank intended to be edged to one of several possible smaller contours, since this would require that the aspheric profile be a "compromise" shape, which in turn reduces overall imagery performance.

The lens is conceived for implementation as a stand-alone optical aid, suitable for use without providing for individual correction for visual defects. This utility is accomplished by abandoning a conventional requirement to view the most distant subject material, and thereby provide more flexibility in operation, because a usable field-of-view may be made considerably wider than in conventional, full range multifocal progressive lenses intended for general-purpose application.

The lens is intended for use as an aid to those who possess good vision, but for whom age has limited the range of focal accommodation, e.g., those afflicted with presbyopia. It is also intended to be forgiving of the precision required in fitting conventional progressive multifocal lenses, whose corridor, i.e., zone of high-acuity viewing, may be quite narrow. While the lens design principles described herein could conceivably be incorporated into conventional prescription lenses, they provide considerable value as an aid to normal vision.

A viewing distance, in the context of lens design, is typically categorized as being one of a near distance, i.e., reading distance, an intermediate distance, or a far distance, i.e., beyond 6 meters. The lens described herein is a multifocal ophthalmic lens optimized for viewing objects from distances of approximately 40 centimeters, i.e., reading distance, up to about four meters.

Such a lens is created by utilizing a mathematical formula, i.e., a Zernike polynomial expansion, not commonly encountered in the ophthalmic field. When fitting polynomial expansion functions to arrays of points, i.e., surface coordinates, complex, high-order functions may often be made to fit better than simple ones, but smoothness may suffer, and performance with it. As described herein, a set of Zernike polynomials is employed to define the surface characteristics of the lenses. Below, there is presented a description of a method for determining a surface characteristic of a lens, and a description of an embodiment of such a lens.

Ophthalmic lens quality is conventionally evaluated and compared using a 5 millimeter (mm) diameter pupil. This diameter, though relatively small, is sufficient to render the astigmatic approximation inadequate in some cases. It is not unusual to discover that an astigmatism-based evaluation of imagery performance differs by as much as a factor of two from measured visual acuity. Reducing the pupil diameter used in this evaluation to perhaps 3.5 mm reduces this discrepancy. This diameter corresponds more closely to that which is present under illumination conditions normally deemed adequate for comfortable reading.

An aberration function is a method for modeling the aberration content in an optical system. Raytrace information is generated by tracing rays through an optical system, enabling the analyst to construct a mathematical model of the aberration content, i.e., the aberration function, of an optical system. Assuming the existence of a 3.5 mm diameter pupil near the center of rotation of the eyeball, an image quality function is constructed having a root sum square (rss) value, enabling the evaluation and quantification of the aberration function, including judiciously-chosen weighting factors, to be used as an acuity metric for the entire lens. The weighting factors are weights assigned to components of the image quality function, in order to insure that the mathematics relate to the physical performance. The acuity metric is a method of correlating the modeled aberration function with its impact upon acuity.

In optimization, acuity metric targets are assigned to diopter power values at locations in the lens that correspond to a desired horizontal and vertical power distribution. Targets are not assigned to those areas that would fall outside the boundary of the lens that would be glazed into a frame containing the lens. To design a PAL as described herein, one would likely employ a computer program to adjust the variables to compel the power across a horizontal strip of the lens to have some constant value, say 1.4 diopter. A different horizontal strip might be assigned different targets, say 0.9 diopter.

Chromatic aberration components, variations of focus or magnification that are color dependent, are ignored, since a single element has no usable variables with which to deal with these image defects. Likewise, geometric distortion, a field-dependent variation in magnification, is not made part of the imagery metric, since this image defect is implicit, to some extent, in any progressive reader, and is non-orthogonal to image defects that affect visual acuity.

The coefficients of a Zernike expansion are employed as design variables, assuming a spherical, i.e., parent curve on the front surface of the lens. The Zernike expansion, or polynomial set, is a fairly complex mathematical formalism. It is a transcendental function having an unlimited number of terms and coefficients. A comprehensive explanation of the construction and application of Zernike polynomials is provided in a pair of volumes of a set titled "Applied Optics and Optical Engineering", edited by Robert R. Shannon and James C. Wyant, Academic Press, Inc. (hereinafter "Shannon and Wyant"). Volume X, pp. 193 -221, discusses theory and applications with much graphical support. In Volume XI, pp. 201 - 238, this theory is connected to image quality interpretations based upon geometrical optics concepts.

The Zernike polynomial employed to model a progressive aspheric surface modifies a basic parent spherical convex front surface. This front surface, as above, may be viewed as having a "sag" function, which represents a departure from flatness, expressed in terms of radial and azimuthal coordinates, referenced to an expansion axis. The total "sag" $Z_T$ of the progressive aspheric surface at any point in the polar coordinate system is the summation of the spherical component $Z_S$ and the Zernike component $Z_Z$:

$$Z_T = Z_S - Z_Z. \quad (1)$$

The spherical component $Z_S$ of the sag of the surface is given by:

$$Z_S = cR^2/[1+(1-c^2R^2)^{1/2}], \quad (2)$$

where c is the reciprocal of the base surface radius of curvature, and R is the normalized zonal radius.

Figure 2:
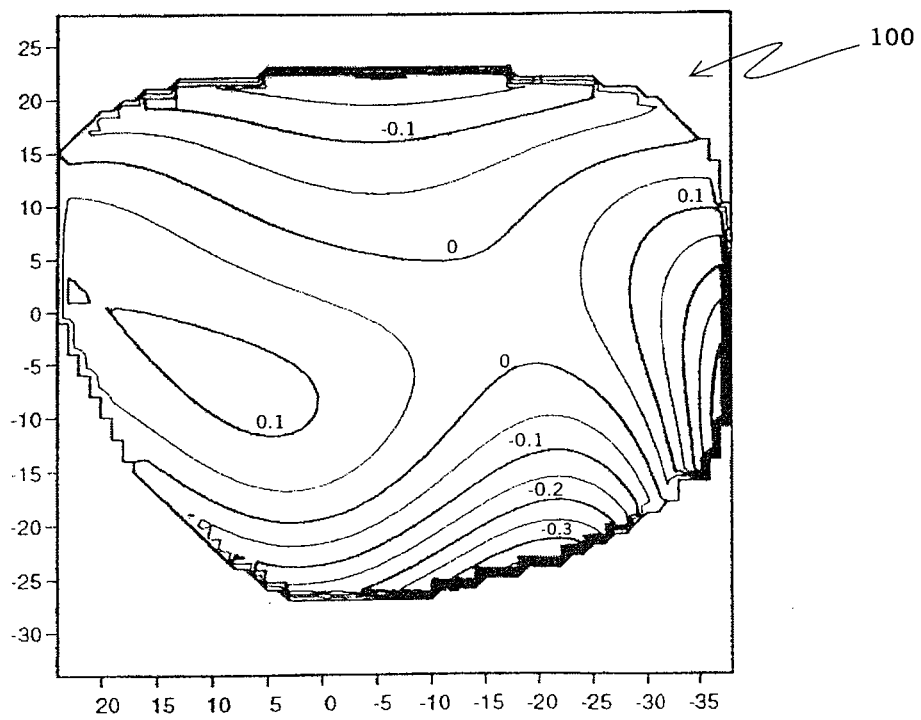
FIG. 2 is a contour plot of the sag differences between the spherical surface and the aspheric deformations.
Figure 3:
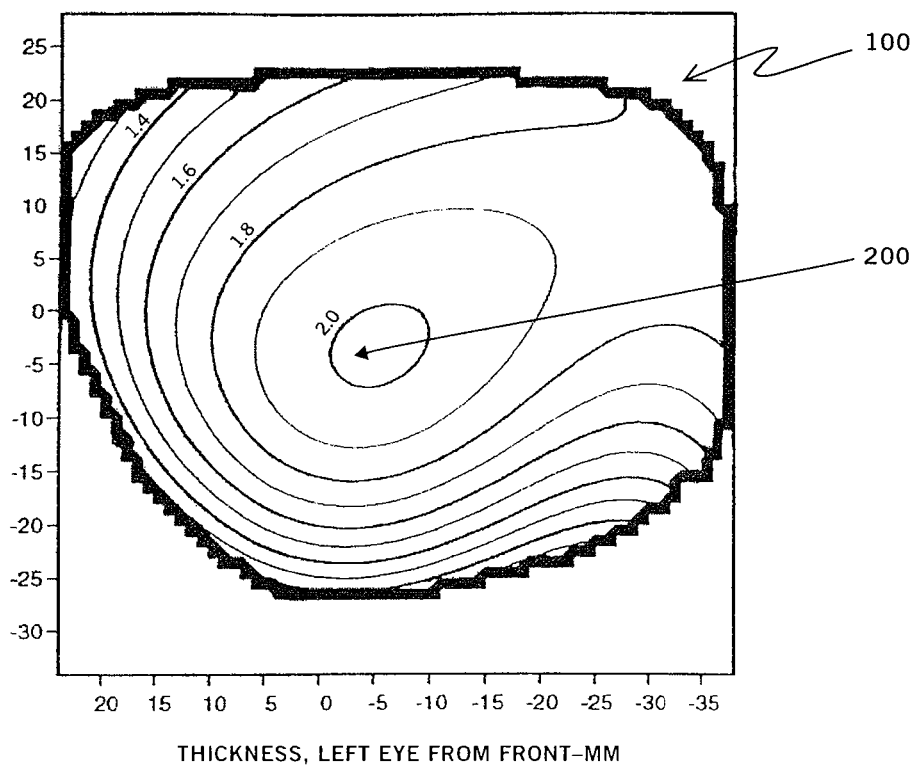
FIG. 3 is a plot depicting the local thickness values for a 2.0 diopter lens.
Figure 4:
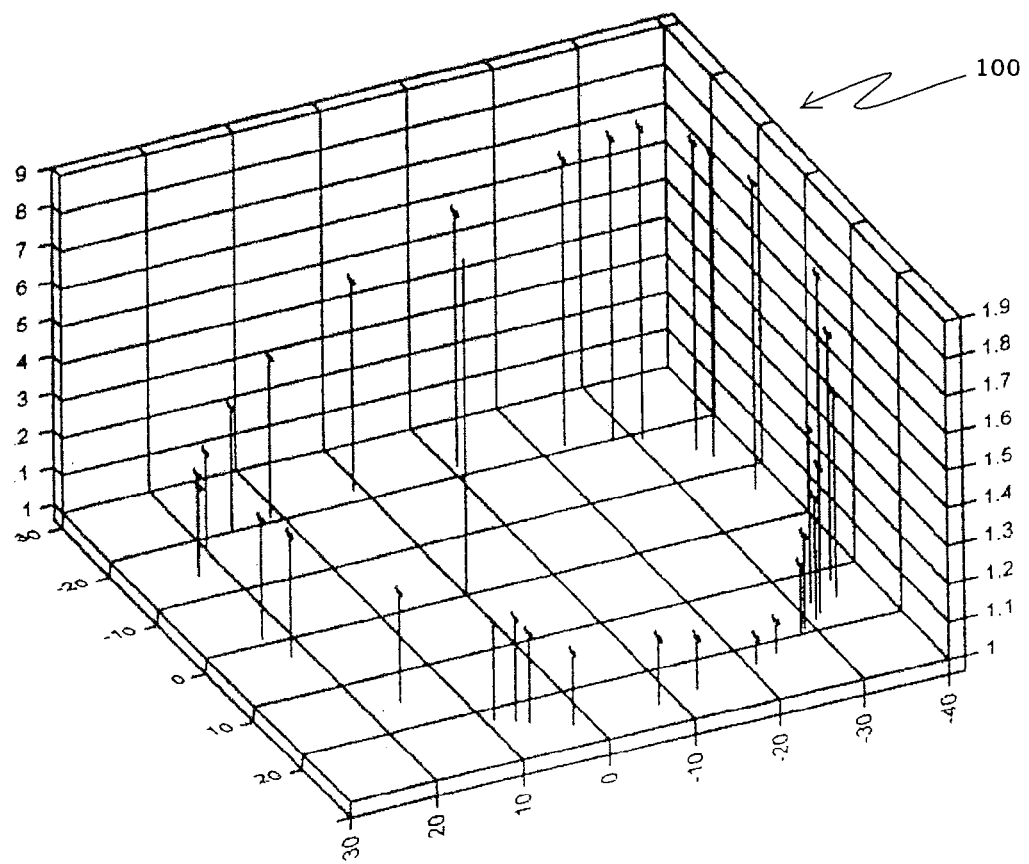
FIG. 4 is a three-dimensional depiction of the edge thickness values for a 2.0 diopter PAL lens.

FIGS. 1-11 depict various characteristics of a lens, generally designated by reference numeral 100. Lens 100 is a left eye lens. That is, a person wearing lens 100 would wear it in front of their left eye. FIGS. 1-3, 5, 6, and 8-11 are views from the perspective of a person facing the wearer, such that the nose of the person wearing lens 100 would be at the lower left side of the figures. In FIG. 4, the nose of the wearer of lens 100 would be at the lower front left corner of the figure.

FIG. 1 is a topological plot of the contours of an aspheric surface of lens 100. The sagittal values, i.e., sags, of the surface are depicted with respect to the highest point on the surface. In FIG. 1, the sag location is indicated as point 110. Point 110, which is an arbitrary point, designated (R, φ), comprises the coordinate location for evaluation of the Zernike expansion for derivation of the sag value.

The Zernike component $Z_Z$ is the fairly lengthy summation, an exemplary form of which is provided below:

$$Z_Z = C_{11} R \cos\phi + D_{11} R \sin\phi + C_{20}(2R^2-1) + C_{22} R^2 \cos(2\phi) + D_{22} R^2 \sin(2\phi) + C_{31}(3R^2-2)R \cos(\phi) + D_{31}(3R^2-2)R \sin(\phi) + C_{40}(6R^4-6R^2+1) + C_{33} R^3 \cos(3\phi) + D_{33} R^3 \sin(3\phi) + C_{42}(4R^2-3)R^2 \cos(2\phi) + D_{42}(4r^2-3)R^2 \sin(2\phi) + C_{51}(10R^4-12R^2+3)R \cos(\phi) + D_{51}(10R^4-12R^2+3)R \sin(\phi) + C_{60}(20R^6-30R^4+12R^2-1) + C_{44} R^4 \cos(4\phi) + D_{44} R^4 \sin(4\phi) + C_{53}(5R^2-4)R^3 \cos(3\phi) + D_{53}(5R^2-4)R^3 \sin(3\phi) + C_{62}(15R^4-20R^2+6)R^2 \cos(2\phi) + D_{62}(15R^4-20R^2+6)R^2 \sin(2\phi) + C_{71}(35R^6-60R^4+30R^2-4)R \cos(\phi) + D_{71}(35R^6-60R^4+30R^2-4)R \sin(\phi) + C_{80}(70R^8-140R^6+90R^4-20R^2+1) + C_{55} R^5 \cos(5\phi) + D_{55} R^5 \sin(5\phi) + C_{64}(6R^2-5)R^4 \cos(4\phi) + D_{64}(6R^2-5)R^4 \sin(4\phi) + C_{73}(21R^4-30R^2+10)R^3 \cos(3\phi) + D_{73}(21R^4-30R^2+10)R^3 \sin(3\phi) + C_{82}(56R^6-105R^4+60R^2-10)R^2 \cos(2\phi) + D_{82}(56R^6-105R^4+60R^2-10)R^2 \sin(2\phi) + C_{91}(126R^8-280R^6+210R^4-60R^2+5)R \cos(\phi) + D_{91}(126R^8-280R^6+210R^4-60R^2+5)R \sin(\phi). \quad (3)$$

This particular interpretation of the Zernike expansion is truncated with term number thirty-four. Carrying additional terms might, or might not improve accuracy, depending upon the specific circumstances. Using more terms in the expansion might, for example, be beneficial when the reading power (in diopters) is quite high.

Additive power is determined in the front, convex, surface of the lens by adding and subtracting Zernike terms to provide for a polynomial deformation of that surface. Following a convention for Zernike terms described in Shannon and Wyant, a non-spherical deformation of the front surface of the lens is determined by adding, algebraically, the summation of the Zernike terms with the constants listed below. The Zernike coefficients below having been computed for a radius normalization value of 50 mm.

$C_{11} = -1.425304$
$D_{11} = 1.028192$
$C_{20} = 0.136984$
$C_{22} = 0.039202$
$D_{22} = 0.924985$
$C_{31} = -0.755616$
$D_{31} = -1.910942$
$C_{40} = 1.047668$
$C_{33} = 0.421116$
$D_{33} = -0.096886$
$C_{42} = -0.527587$
$D_{42} = 0.629941$
$C_{51} = -0.332642$
$C_{51} = -0.797667$
$C_{60} = 0.034681$
$C_{44} = -0.000530$
$D_{44} = -0.015176$
$C_{53} = 0.377007$
$D_{53} = -0.084890$
$C_{62} = -0.294204$
$D_{62} = 0.254671$
$C_{71} = -0.159434$
$D_{71} = -0.021080$
$C_{80} = -0.038708$
$C_{55} = 0.072358$
$D_{55} = -0.096909$
$C_{64} = -0.039248$
$D_{64} = -0.106494$
$C_{73} = 0.084212$
$D_{73} = 0.091244$
$C_{82} = -0.044443$
$D_{82} = 0.059156$
$C_{91} = -0.037741$
$D_{91} = 0.017304$

The merit function, i.e., image quality function, for the lens is optimized using a modified least-squares path-of-steepest-decent technique, with adjustments made several times to the image quality function construction as the lens approaches its desired performance. For an explanation of the "merit function" composition, see: Smith, Warren J., "Modern Lens Design", McGraw-Hill, 1992, or Laikin, Milton, "Lens Design", n2 E CI Marcel-Decker, 1995. Adjustments are made to the Zernike coefficients in order to optimize both the distribution of diopter power and the image quality. The process of lens optimization is, in general, well known to experts in the field. See Smith or Laikin above.

The PAL concept and design optimization approach described above are applicable to a wide range of applications and requirements. The concept described herein, utilizing a Zernike polynomial model of the progressive aspheric surface, might well be applied to a lens configuration of any peripheral dimensions, and might well be utilized to create a wide range of maximum/minimum power over an arbitrary corridor length. In particular, although the figures depict the properties of a specific lens shape, having a maximum power zone of 2.0 diopter, a different peripheral lens shape might be addressed, or the design modified to create a different maximum power, say 1.5 diopters. The deterministic optimization procedure described above, and the diopter power distribution, may be varied within rather wide limits, say 0.25 to 4.0 diopters, to produce an assortment of designs for compensation of varying amounts of presbyopia. An approach, utilizing actual raytrace information to model image quality, is preferable to the use of differential geometry to model surface shapes, which only infers image quality.

There are, of course, many possible methods that might be used for defining an optical surface shape. The Zernike expansion, it was decided, is appropriate to this application. However, Legendre polynomials might have worked as well. In either case, the contour of the aspheric surface is evaluated at any selected point in radial/azimuthal coordinates to derive the topology. The opposite side of the lens is a simple spherical surface. In an exemplary embodiment, its radius is 101 mm.

Figure 5:
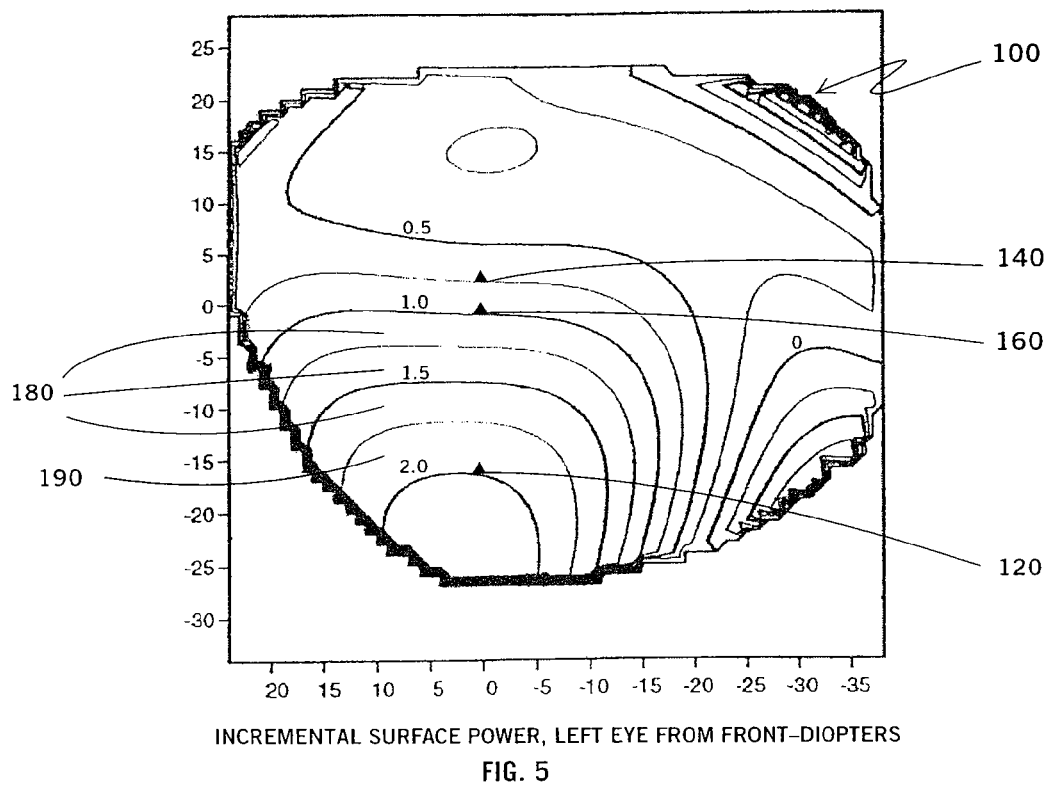
FIG. 5 is a graphic depicting incremental surface power contour intervals present in the aspheric surface of a 2.0 diopter lens, based upon differential geometry calculations.

FIG. 5 is a contour interval-style diagram depicting the incremental surface power of lens 100 and the local power present in the aspheric surface of lens 100, based upon differential geometry calculations. Lens 100 has power of approximately 2.0 diopter in a reading zone 120.

A major reference point (MRP) is used, in optometric fitting, to locate a lens blank with respect to a fitting to a patient, and to a template used to create a lens peripheral shape from a blank. Referring to FIG. 5, an MRP 140 is utilized for establishing a location of lens 100 in a frame (see FIG. 11). The reading power is present at reading zone 120 approximately 18 mm below MRP 140, which is in turn located 2 mm above a geometric center 160 of the Zernike expansion function. That is, MRP 140 is located 2 mm above the coordinate center (geometric center) of the Zernike expansion. The power halfway between MRP 140 and reading zone 120 is approximately 1.6 diopters. In the upper portion of the lens, the dioptric power diminishes to about 0.20 diopter at a vertical distance of 10 mm above MRP 140.

Normally, in prescription ophthalmic optics, the actual "lens" is a portion of a large (70-75 mm) circular blank. Once the patient selects a frame, facial factors are measured (inter-pupillary distance, bridge height, etc.), and the lens is "fitted" for edging. As explained below, lens 100 is designed for a specific frame configuration, and thus, does not require the conventional fitting process to be applied.

Lens 100 has a generic peripheral shape, and, for the exemplary embodiment in FIG. 5, a width dimension of about 58 mm, and a height of approximately 46 mm. Specifically, its width might range from 45 to 65 mm, and the height from 30 to 55 mm. In this configuration, certain subtle fitting considerations, e.g., alignment marks and position indicators, normally included in the glazing of prescription progressive eyewear have been omitted. Consequently, considerations such as near-point convergence angle, pantascopic tilt, and prism thinning have been included in lens 100, and will have correct values, despite the fact that lens 100 will not be edged in conventional fashion.

Although lens 100 is described in FIG. 5 as having power of approximately 2.0 diopter in reading zone 120, it may be made suitable, by modifying the Zernike coefficients, for applications having as much as 4 diopter reading power, or as little as 0.25 diopter.

FIG. 2 is a contour interval-style plot of the front sag difference, subtracting the best fitting sphere of lens 100. That is, it shows a contour plot of the sag differences between the spherical surface and the aspheric deformations. Note the deformations have no axial or bilateral symmetry. FIG. 2 depicts contour intervals of aspheric departures from a best fitting spherical radius. In general, it will be possible to begin with some spherical surface, and then remove material, so that a desired aspheric surface is the result. Also, in general, the material to be removed may be minimized by beginning with a "best fit sphere" having a proper radius. While the aspheric surface may not actually be created by material removal, the concept is useful in describing the various characteristics of the aspheric surface.

FIG. 3 is a contour interval-style plot of the thickness of lens 100. FIG. 3 illustrates variation in thickness for various locations in lens 100. Note that the thickness values vary from about 2.0 mm near the center, and from 1.7 to about 1.0 m around the edge. In order to fit properly in a frame, and in order to possess sufficient thickness for safety purposes, the thickness of lens 100 must be adequate at all points on its periphery, and in its central zones. Since local thickness is related to the Zernike coefficients, it may be seen that local power variations will be accompanied by thickness variations in the lens. Greatest thickness values are in a region 200 near an eye pupil location, i.e., straight-ahead gaze, and the thickness tapers to values between 1.8 mm and 1.1 mm elsewhere.

FIG. 4 is a perspective-style diagram depicting peripheral edge thickness of lens 100. For clarity, only edge thickness values are shown.

Referring again to FIG. 5, there is shown incremental power distribution for lens 100 computed from an average of local principal curvatures (differential geometry). Heavy lines represent 0.5 diopter intervals. Thin lines represent 0.25 diopter intervals. Contours of constant (mean) power zones 180 are generally evenly spaced and not precisely horizontal, but slightly curved, with a power zone 190 approaching reading zone 120 being slightly farther apart and curved somewhat downward. Note that FIG. 5 portrays incremental surface power (added to the spherical surface) derived by computing mean power from differential geometry, not from loci of constant power based upon best acuity. Power derived from differential geometry is simply the power computed as the average of the two principal curvatures. It is, in effect, the power average of the astigmatic contours of the surface. This interpretation allows one only to portray power and astigmatism. Other more complex surface deformations may be present that would result in non-astigmatic aberration forms.

Figure 6:
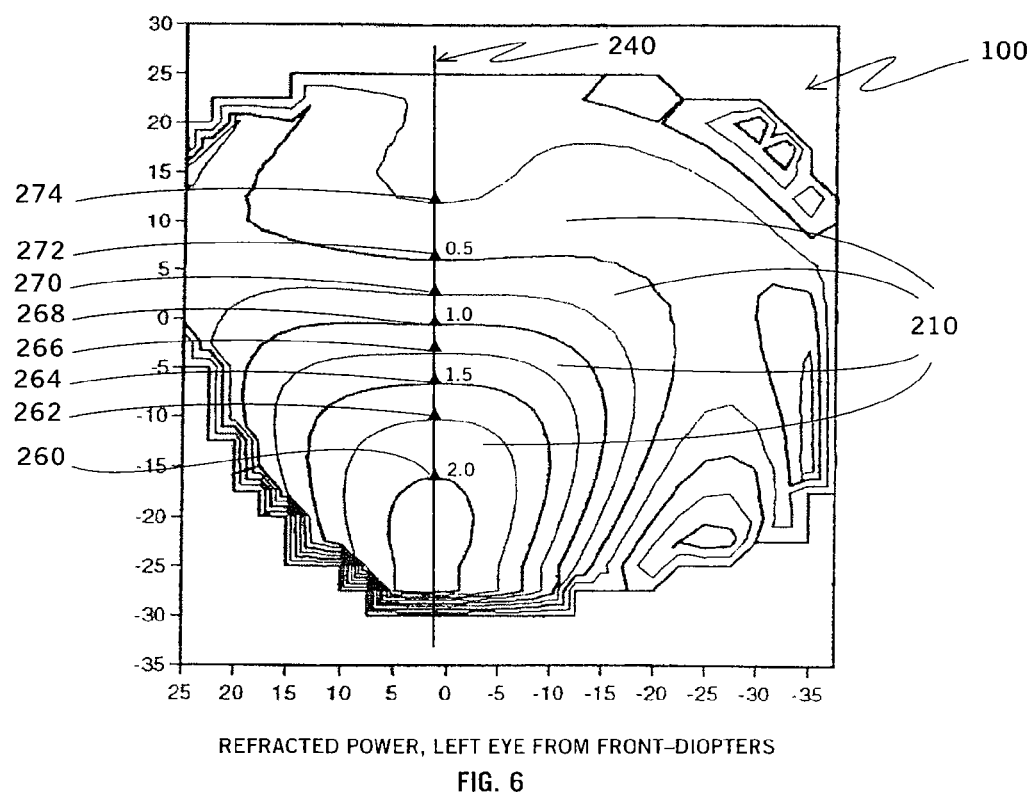
FIG. 6 is a graphic depicting the distribution of contour intervals of refractive power in a 2.0 diopter example of a PAL, based upon raytrace calculations.

FIG. 6 is a contour interval-style plot of actual refracted power of lens 100. FIG. 6 represents refracted power computed by locating an optimum focus for a systematic array of locations in surface coordinates of lens 100. Optimum foci for different portions of lens 100 have been computed by tracing large numbers of rays through those portions of lens 100. The computed focal locations were then used to determine the actual refracted power, taking into account contributions from all aberration forms. Shapes of zones of constant refracted power 210 are discernibly different from those power zones 180 of FIG. 5, particularly in the areas having relatively high refracted power, e.g., below MRP 140. Minor details and differences in the curve shapes computed by surface geometry and refraction are not terribly consequential, as they can, in the case of the refracted imagery model, be dependent upon the sampling interval for the display. For example, a refracted power value of 1.124 diopter might be displayed as 1.0 diopter, whereas a value of 1.126 diopter might be displayed as 1.25 diopter. It should also be noted that the shapes of these contours would be incrementally, but significantly, different if computed for a pupil diameter different from 3.5 mm.

With reference to FIG. 6, consider a vertical line 240 through a corridor on lens 100. Vertical line 240 includes reference points 260, 262, 264, 266, 268, 270, 272 and 274. Table 2 lists vertical locations on the lens and a refracted power for each of these points. For example, point 274 is at a vertical location designated as +12 cm, and has a refracted power of 0.25 diopter. Thus, lens 100 has a refracted power that progresses from a first refracted power, i.e., 0.25 diopter, at point 274 in the corridor to a second refracted power, i.e. 2.0 diopters, at point 260 in the corridor, in a vertical direction of about 28 mm from point 274.

TABLE 1

| Reference Point | Vertical Location (millimeters) | Refracted Power (diopter) |
| --- | --- | --- |
| 274 | +12 | 0.25 |
| 272 | +6 | 0.50 |
| 270 | +2 | 0.75 |
| 268 | −1 | 1.0 |
| 266 | −4 | 1.25 |
| 264 | −7 | 1.50 |
| 262 | −10 | 1.75 |
| 260 | −16 | 2.00 |

Figure 7:
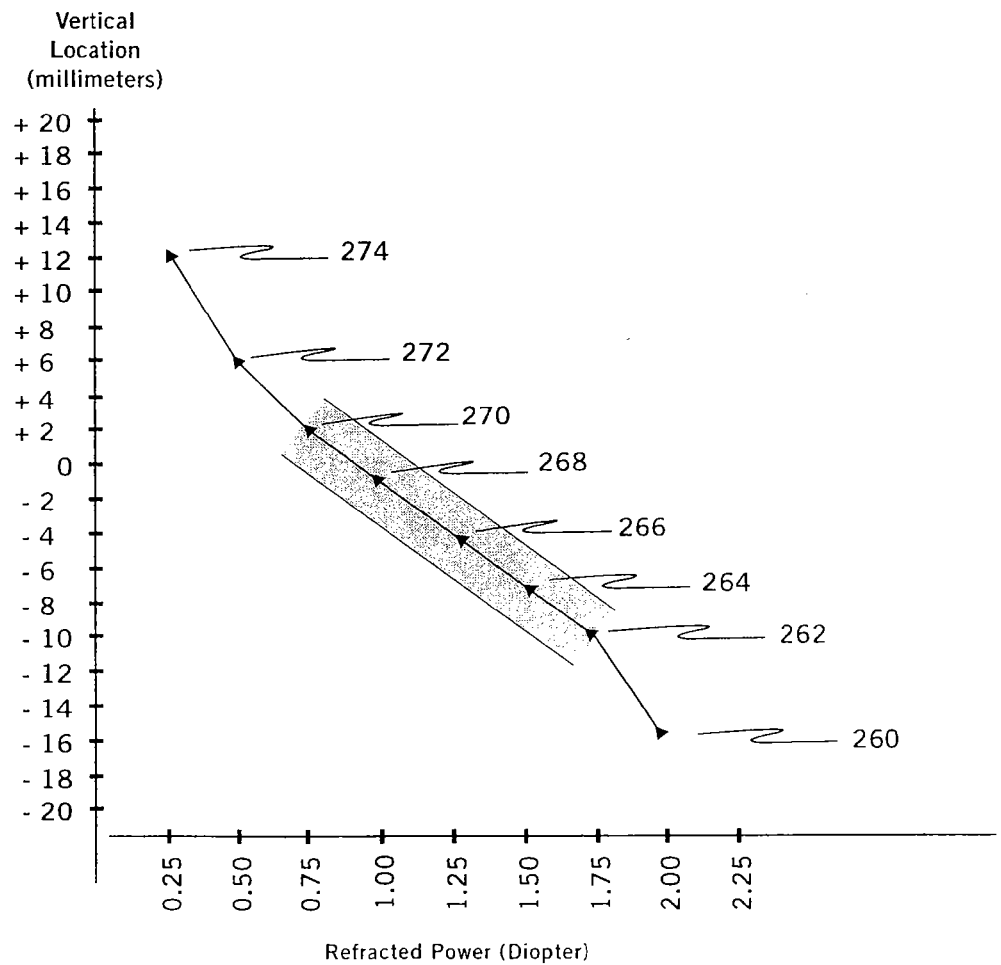
FIG. 7 is a graphic depicting the rate of progression of refracted power in the surface of a 2.0 diopter lens.

FIG. 7 is a graphic representation of the data in TABLE 1 depicting the rate of progression of refracted power in the surface of a 2.0 diopter lens. Consider a zone extending from point 270 to point 262. This zone has a length of about 12 mm and includes all powers required for viewing objects at intermediate distances, e.g., distances of about 55 cm to about 135 cm. Refracted power progresses in the zone from a first refracted power at the top of the zone, point 270, through the refracted powers at points 268, 266, and 264 to the refracted power at the bottom of point 262. Note that refracted power progresses linearly from any point to any other point in the zone. Note also that the rates of change from each end of the zone, i.e., from point 270 to point 272 and from point 262 to point 260, are slightly slower than the rate of change in the zone, and the rate of change from point 272 to point 274 is identical to the rate of change from point 262 to point 260. The average rate of power change from the top of the corridor, point 274, to the bottom of the corridor, point 260, is 0.0625 diopter per millimeter which provides a smooth uninterrupted transition from one power to another.

Figure 8:
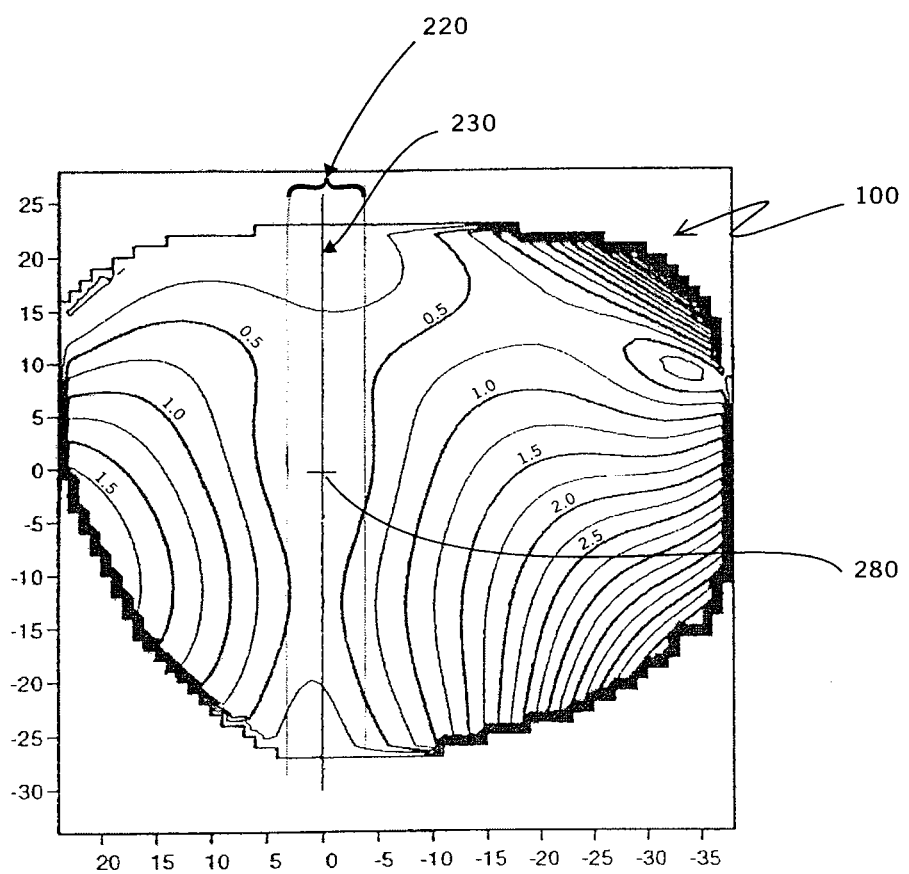
FIG. 8 depicts local incremental astigmatism contour intervals (e.g., 0.5 diopter) based upon a difference in principal surface curvatures in a 2.0 diopter lens.

FIG. 8 is a contour interval-style plot of incremental surface astigmatism of lens 100. FIG. 8 illustrates a distribution of astigmatism, expressed in diopter, calculated from differential surface geometry. Heavy contour lines occur at intervals of 0.5 diopter, and light contour lines, separating the heavy contour lines, represent astigmatism intervals of 0.25 diopter. Note that for lens 100, astigmatism content is less than 0.5 diopter inside a zone 220 centered about a meridian 230 through a center 280 of the Zernike coordinate system depicted in FIG. 1. Note that a corridor defined by the contour intervals of 0.5 astigmatism has a width greater than or equal to about 6 millimeters along its length. Note also that a corridor defined by the contour intervals of 1.0 diopter astigmatism has a width greater than or equal to about 15 millimeters.

Figure 9:
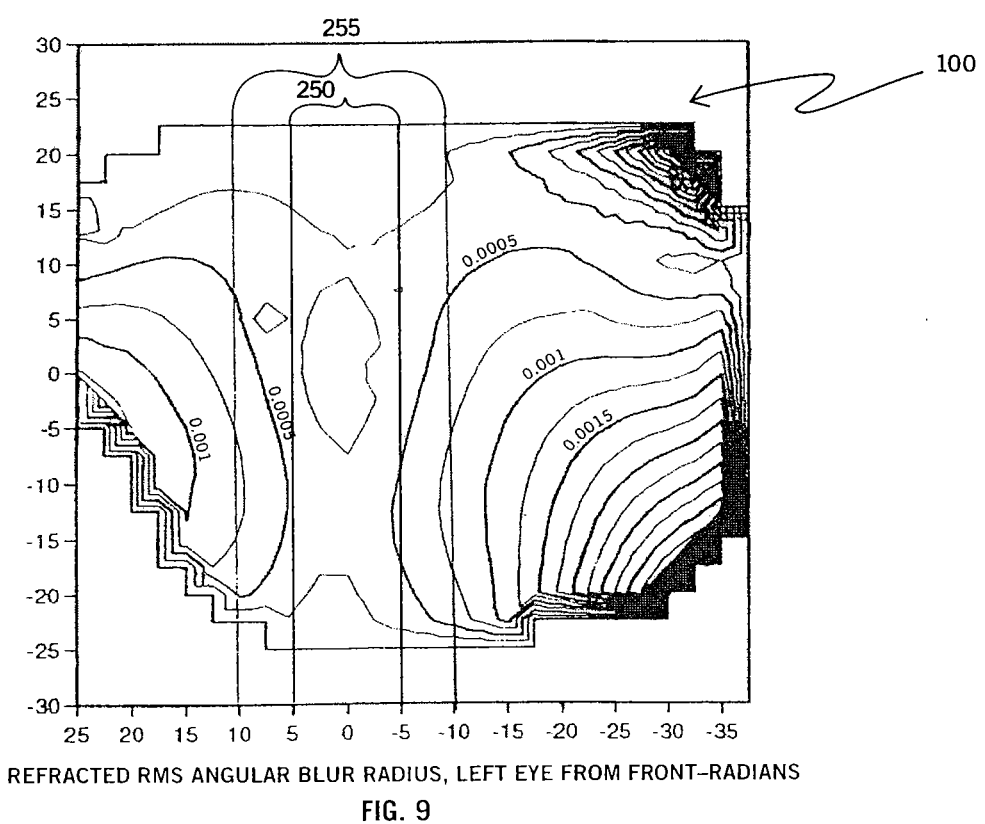
FIG. 9 is a topographic map of image quality throughout a 2.0 diopter lens, depicting contour intervals of refracted RMS angular blur radius expressed in radians (e.g., 0.0005 radians), based upon actual raytrace calculations.

FIG. 9 is a topographic map of image quality, based upon raytrace calculations, throughout a 2.0 diopter lens. Image quality is expressed in radians. Under normal conditions (lighting, object field contrast, chromatic content, etc.), the functional acuity threshold of the human visual system is 2-3 arc minute, or about 0.0006 to 0.0009 radians. Angular blur radius portrays the fidelity with which a point object is focused. Under average lighting and contrast conditions, the average human eye will resolve detail of the order of about 0.0005 radians. Thus, lens 100 is designed to have a refracted RMS angular blur radius less than or equal to about 0.0005 radians in the corridor. FIG. 9 shows contours of blur sizes expressed in radians, and these contours create a somewhat different picture of lens performance, compared to the astigmatism map of FIG. 8. Given that 20-20 vision corresponds to a threshold resolution limit of about 1 arc minute, which is only achievable in ideal contrast conditions, and that this corresponds to about 0.0003 radian, excellent acuity should be possible with lens 100 over a corridor 250 having a width of greater than or equal to about 10 mm along its length. If the pupil diameter were to be reduced below 3.5 mm, visual acuity would be limited only by the eye itself over a corridor 255 as wide as 20 mm.

Figure 10:
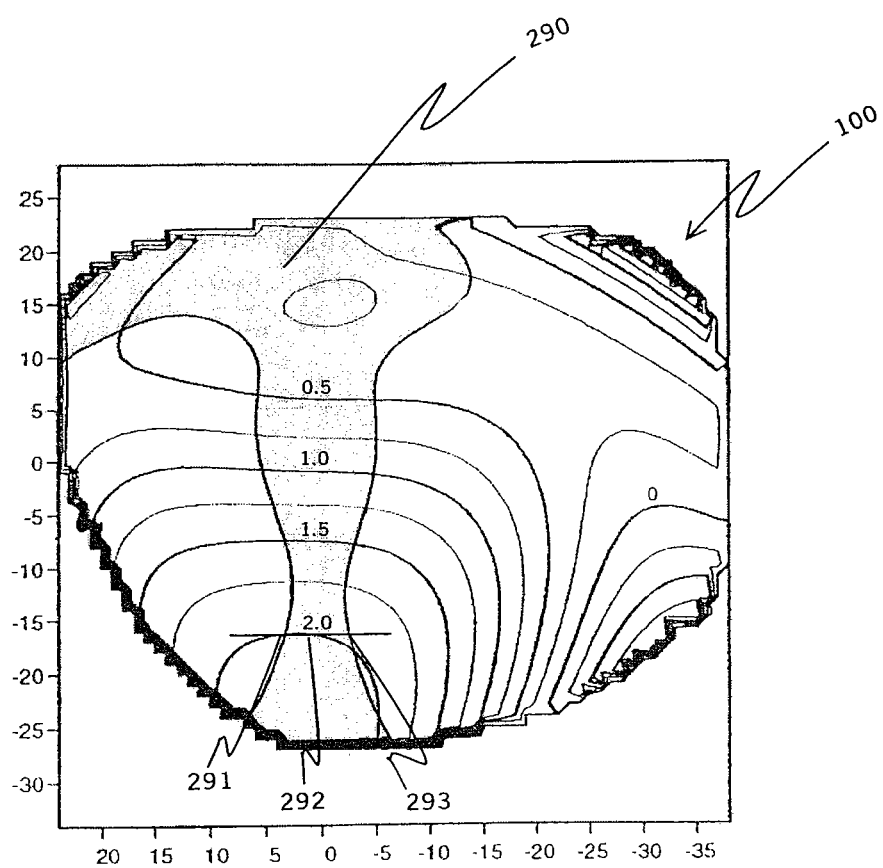
FIG. 10 is a plot of the 0.5 diopter incremental astigmatic contour interval of FIG. 8 superposed upon the incremental surface power contour intervals of FIG. 5.

FIG. 10 is a composite plot that superimposes some of the surface astigmatism information of FIG. 8 upon the surface power information of FIG. 5. Zone 290 is an area of high acuity implied by the 0.5 diopter astigmatism zone overlayed upon the lens 100 surface power contour intervals. However, zone 290 represents only a construct based upon differential surface geometry, not addressing the effects of pupil diameter.

Assume a horizontal line 292 through zone 290 that includes a point 291 on a left side of zone 290 and a point 293 on a right side of zone 290. At point 291, surface power is about 2.0 diopters, and at point 293, surface power is about 1.95 diopters. Thus, power varies along horizontal line 292 by about 0.05 diopter (i.e., 0.05=2.0−1.95). Generally, for any line across zone 290 in a horizontal direction, power varies from a constant value, e.g., 2.0 diopters, by less than or equal to about 0.075 diopter. Note also, that the power extends in the horizontal direction beyond the sides of zone 290. Lens 100 has incremental surface power that varies from a constant value by less than or equal to about 0.075 diopter in a horizontal direction over a width greater than or equal to about 10 millimeters that includes corridor 220 (see FIG. 8).

Figure 11:
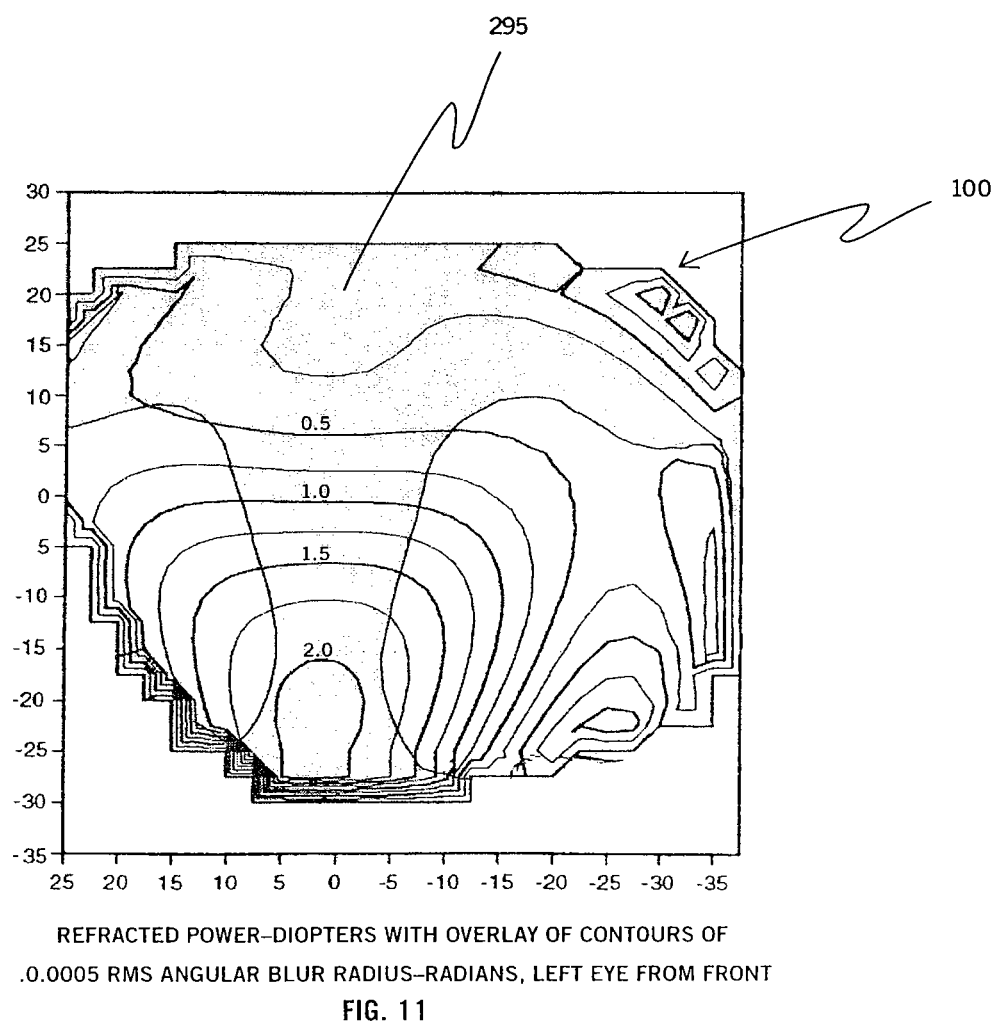
FIG. 11 is a plot created by superposing the 0.0005 radian blur contour interval from FIG. 9 upon the raytrace-based refracted power contour intervals of FIG. 6.

FIG. 11 is a composite plot that superimposes some of the refracted RMS angular blur radius information of FIG. 9 upon the refracted power information of FIG. 6. Zone 295 is an area of high acuity which takes into account aberration products present in a 3.5 mm diameter pupil, and which is implied by the RMS blur radius zone of less than 0.0005 radian in FIG. 9. Note that, while zone 295 roughly resembles zone 290 of FIG. 10, there are qualitative and quantitative differences. The power contours are uniformly spaced, but very slightly curved in zone 295. More particularly, zone 295 is wider than zone 290, based upon calculations for a 3.5 mm diameter pupil. Had the design been created for a different pupil size, zone 295 would be differently-shaped, and its width and area different also.

Although several polymeric materials are candidates for implementation of lens 100, a preferred material for lens 100 is a polymeric material known as polycarbonate, having a nominal index of refraction of 1.5855 at 587.6 nanometers. Lens 100 has a concave rear surface radius of curvature of 101 mm. Its front surface is convex, spaced at a vertex distance of about 2.2 mm from the rear surface, and possesses a base radius of 103 mm. Lens 100 has a form that is referred to as a weak positive meniscus.

Figure 12:
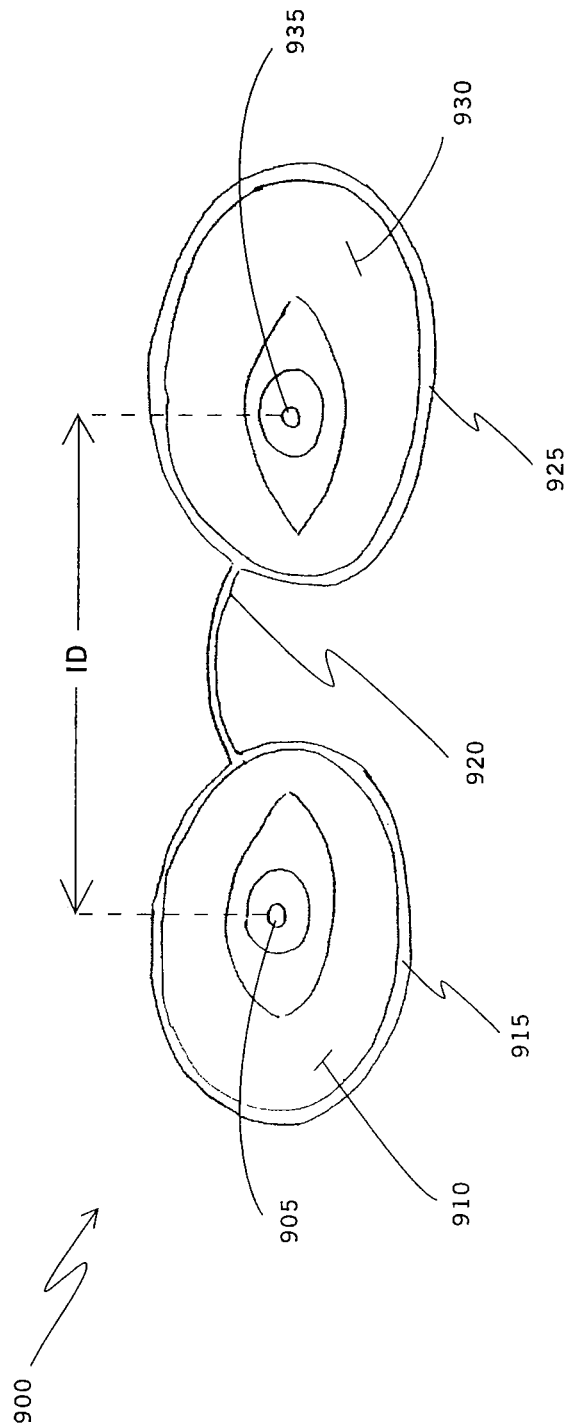
FIG. 12 is an illustration of an item of eyewear that includes a pair of lenses designed and manufactured in accordance with the present invention.

FIG. 12 is an illustration of an item of eyewear, i.e., glasses 900. Glasses 900 includes a frame 920 in which a lens 910 and a lens 930 are situated. Glasses 900 may or may not include rims 915 and 925. Lenses 910 and 930 are each molded to a specific predetermined shape and a specific predetermined size, and fitted into frame 920 without edging.

Lenses 910 and 930 are similar to lens 100, but being designed and manufactured for a right eye and left eye. When a person is wearing frame 920, the corridor of lens 910 is situated in front of the person's right pupil 905, and the corridor of lens 930 is situated in front of the person's left pupil 935.

The relative positioning of lenses 910 and 930 satisfies a span of interpupillary distances of at least 6 mm. For example, glasses 900, i.e., a single pair of glasses, could satisfy both an interpupillary distance of 57 mm and an interpupillary distance of 63 mm.

For each lens described herein, the design of the lens can be conveyed on or in a tangible medium such as a paper or computer-readable storage device (e.g., compact disk or electronic memory). For example, where the designing includes representing a surface of the lens by way of a Zernike expansion, the Zernike expansion, and thus the design, can be conveyed on the paper or in the computer-readable storage device. Also, any of the lenses described herein can be configured as a progressive addition lens.

It should be understood that various alternatives and modifications of the present invention could be devised by those skilled in the art. The present invention is intended to embrace all such alternatives, modifications and variances that fall within the scope of the appended claims.

What is claimed is:

1. An item of eyewear, comprising:
   a lens holder; and
   a pair of progressive addition lenses situated in said lens holder to satisfy a span of interpupillary distances of at least 6 millimeters,
   wherein said pair of progressive addition lenses includes a lens having a surface that has a continuous monotonic change of power through (a) a first zone for reading at a distance of about 35 centimeters to about 45 centimeters from said lens through (b) a second zone for viewing at near and intermediate distances from about 45 centimeters to about four meters from said lens, and wherein said second zone includes a corridor having a length of greater than or equal to about 16 millimeters and a width of greater than or equal to about 6 millimeters along said length.

2. A method comprising: representing a surface for each of a pair of ophthalmic lenses by way of a Zernike expansion; and situating said pair of ophthalmic lenses in a lens holder to satisfy a span of interpupillary distances of at least 6 millimeters wherein said pair of ophthalmic lenses includes a lens having a surface that has a continuous monotonic change of power through (a) a first zone for reading at a distance of about 35 centimeters to about 45 centimeters from said lens through (b) a second zone for viewing at near and intermediate distances from about 45 centimeters to about four meters from said lens, and wherein said second zone includes a corridor having a length of greater than or equal to about 16 millimeters and a width of greater than or equal to about 6 millimeters along said length.

3. The method of claim 2, wherein said ophthalmic lenses are progressive addition lenses.

4. The method of claim 3, wherein said ophthalmic lenses are aspheric lenses.

5. A method comprising:
designing an ophthalmic lens,
wherein said designing employs, as design parameters,
  (a) a predetermined boundary shape of said ophthalmic lens for ultimate use, and
  (b) a predetermined boundary size of said ophthalmic lens for ultimate use,
wherein said ophthalmic lens has a surface having a continuous monotonic change of power through (a) a first zone for reading at a distance of about 35 centimeters to about 45 centimeters from said ophthalmic lens through (b) a second zone for viewing at near and intermediate distances from about 45 centimeters to about four meters from said ophthalmic lens, and
wherein said second zone includes a corridor having a length of greater than or equal to about 16 millimeters and a width of greater than or equal to about 6 millimeters along said length.

6. The method of claim 5, wherein said ophthalmic lens is a progressive addition lens.

7. The method of claim 5, wherein said ophthalmic lens is an aspheric lens.

8. The method of claim 5, wherein said designing comprises representing said surface by way of a Zernike expansion.

9. The method of claim 8, wherein said Zernike expansion employs at least ten terms.

10. The method of claim 5, wherein said designing employs, as a design parameter, a pupil size of a wearer for use of said ophthalmic lens.

11. The method of claim 5, further comprising manufacturing said ophthalmic lens.

12. The method of claim 11, further comprising situating said ophthalmic lens in a lens holder.

13. The method of claim 5, wherein said ophthalmic lens is one of two such lenses that when situated in a lens holder satisfy a span of interpupillary distances of at least 6 millimeters.

14. The item of claim 1, wherein said lens has surface astigmatism less than or equal to about 0.5 diopter within said corridor.

15. The method of claim 2, wherein said lens has surface astigmatism less than or equal to about 0.5 diopter within said corridor.

16. The method of claim 5, wherein said lens has surface astigmatism less than or equal to about 0.5 diopter within said corridor.

* * * * *